(12) United States Patent
Tonetti et al.

(10) Patent No.: US 7,614,217 B2
(45) Date of Patent: Nov. 10, 2009

(54) METHOD AND DEVICE FOR ACTIVATING REGENERATION OF A NITRIC OXIDE ADSORBER

(75) Inventors: Marco Tonetti, Orbassano (IT); Alberto Gioannini, Orbassano (IT); Francesco Bechis, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/357,410

(22) Filed: Feb. 21, 2006

(65) Prior Publication Data

US 2006/0248882 A1 Nov. 9, 2006

(30) Foreign Application Priority Data

May 3, 2005 (EP) .................................. 05425284

(51) Int. Cl.
*F01N 3/00* (2006.01)
(52) U.S. Cl. .............................. 60/295; 60/274; 60/286; 60/297
(58) Field of Classification Search .................. 60/274, 60/276, 285, 286, 295, 297, 301, 280
See application file for complete search history.

(56) References Cited

U.S. PATENT DOCUMENTS

| | | | | |
|---|---|---|---|---|
| 5,437,153 A | * | 8/1995 | Takeshima et al. | 60/276 |
| 5,740,669 A | * | 4/1998 | Kinugasa et al. | 60/285 |
| 5,771,685 A | | 6/1998 | Hepburn | |
| 5,894,725 A | * | 4/1999 | Cullen et al. | 60/274 |
| 6,327,848 B1 | * | 12/2001 | Poggio et al. | 60/276 |
| 6,477,834 B1 | * | 11/2002 | Asanuma et al. | 60/295 |
| 6,487,853 B1 | * | 12/2002 | Hepburn et al. | 60/295 |
| 6,490,856 B2 | * | 12/2002 | Bidner et al. | 60/274 |

FOREIGN PATENT DOCUMENTS

| | | |
|---|---|---|
| EP | 0 580 389 A1 | 1/1994 |
| EP | 0 997 626 A1 | 5/2000 |
| EP | 1 083 306 A1 | 3/2001 |
| EP | 1 402 935 A1 | 3/2004 |

* cited by examiner

*Primary Examiner*—Binh Q Tran
(74) *Attorney, Agent, or Firm*—Berenato, White & Stavish, LLC

(57) ABSTRACT

A method of activating regeneration of a nitric oxide adsorber (8) for treating exhaust gas produced by an internal combustion engine (1) of a vehicle, the method including the steps of determining the fill level (FILL) of the nitric oxide adsorber (8); monitoring the running conditions of the vehicle and/or the operating conditions of the engine (1); and activating regeneration of the nitric oxide adsorber (8) when the fill level (FILL) of the nitric oxide adsorber (8) exceeds a maximum fill level ($FILL_{MAX}$), and the running conditions of the vehicle and/or the operating conditions of the engine (1) are favourable to regeneration.

7 Claims, 4 Drawing Sheets

METHOD AND DEVICE FOR ACTIVATING REGENERATION OF A NITRIC OXIDE ADSORBER

BACKGROUND OF THE INVENTION

1. Field of the Invention

The present invention relates to a method and device for activating regeneration of a nitric oxide adsorber.

2. Description of the Related Art

As is known, diesel engine emissions comprise the following compounds, some of which are harmful to health and/or the environment:

- carbon dioxide ($CO_2$) and steam ($H_2O$), both produced by complete combustion of hydrocarbons in diesel fuel;
- unburnt hydrocarbons (HC) and carbon monoxide (CO), both produced by incomplete combustion of hydrocarbons in diesel fuel;
- nitric oxides ($NO_X$) produced by oxidation of nitrogen in the engine air intake; and
- particulate, mainly produced by incomplete combustion of the injected fuel.

Carbon monoxide and hydrocarbons are convertible to carbon dioxide and steam by the following oxidation process, which is active when the air-fuel mixture is lean, i.e. high in oxygen:

$$CO+HC+O_2 \rightarrow CO_2+H_2O$$

Nitric oxides, on the other hand, are convertible to carbon dioxide, nitrogen, and steam by the following reduction process, which is effective when the air-fuel mixture is rich:

$$NO_x+CO+HC \rightarrow N_2+CO_2+H_2O$$

Otto engines can exploit the above phenomena simultaneously.

To effectively eliminate all three of the above pollutants (HC, CO, $NO_X$), the air-fuel mixture in the combustion chamber of Otto engines equipped with a trivalent catalyst must be stoichiometric, i.e. the amount of air fed into the combustion chamber must be the exact amount required to burn the fuel in the combustion chamber.

Trivalent catalysts, however, are unsuitable for use in diesel engines, operation of which calls for an air quantity in excess of stoichiometric proportions (lean operation), thus preventing reduction of nitric oxides in normal operating conditions, for the reasons stated above.

Nitric oxides produced by diesel engines, therefore, cannot be eliminated using a trivalent catalyst, and the effectiveness of a catalyst in this type of engine is limited solely to oxidizing carbon monoxide and hydrocarbons into carbon dioxide and steam.

In diesel engines, nitric oxides may be eliminated using a so-called nitric oxide adsorber, whereby, during normal operation of the engine, nitrogen monoxide (NO) is converted to nitrogen dioxide ($NO_2$) by an oxidizing element, e.g. platinum (Pt), is then trapped in an adsorbent compound, e.g. barium oxide (BaO), and is separated, at a specific operating stage, into nitrogen and carbon dioxide by a reducing element, e.g. rhodium (Rh). The operating stage, known as regeneration, is achieved by calibrating the diesel engine to produce a reducing environment (rich operation) in the exhaust gas for a few seconds.

During the adsorption process, the barium oxide ultimately becomes unable to store nitrogen monoxide (NO), on account of saturation of the acceptor sites; and, when the nitric oxide adsorber reaches a saturation level at which nitric oxides are no longer eliminated effectively, the acceptor sites must be "cleared" periodically by so-called regeneration, i.e. desorption and simultaneous reduction of nitric oxides.

As stated, nitric oxide adsorption and deadsorption are closely related to the composition of the air-fuel mixture during operation of the engine. That is, to adsorb nitric oxides, the air-fuel mixture must be lean (i.e. oxidizing), whereas, to desorb and reduce nitric oxides, the air-fuel mixture must be rich (i.e. reducing).

More specifically, the nitric oxide adsorption and reduction mechanism commences in lean air-fuel mixture conditions, with oxidation of nitrogen monoxide (NO) into nitrogen dioxide ($NO_2$) by the platinum (Pt) acting as a catalyst, according to the equation:

$$NO+\tfrac{1}{2}O_2 \rightarrow NO_2$$

Subsequently, the nitrogen dioxide ($NO_2$) reacts with the adsorbent element—barium oxide (BaO) in the example shown—by which it is trapped (i.e. chemically sorbed) in the form of barium nitrate ($Ba(NO_3)_2$), according to the equation:

$$BaO+NO_2+\tfrac{1}{2}O_2 \rightarrow Ba(NO_3)_2$$

At the regeneration stage, the air-fuel mixture is enriched for a predetermined time period to increase carbon monoxide and unburnt hydrocarbon emissions and impart reducing properties to the exhaust gas.

The reducing atmosphere produces thermodynamic instability in the barium nitrate, which thus releases nitrogen monoxide (NO) and nitrogen dioxide ($NO_2$), according to the equations:

$$Ba(NO_3)_2 \rightarrow BaO+2NO+\tfrac{1}{2}O_2$$

$$Ba(NO_3)_2 \rightarrow BaO+2NO_2+\tfrac{1}{2}O_2$$

In rich air-fuel mixture conditions, and thanks to the presence of rhodium as a catalyst, nitrogen monoxide (NO) and nitrogen dioxide ($NO_2$) are reduced by carbon monoxide (CO), hydrogen and hydrocarbons to nitrogen ($N_2$) and carbon dioxide ($CO_2$).

One possible reduction path is the equation:

$$NO+CO \rightarrow \tfrac{1}{2}N_2+CO_2$$

The success of the process depends directly on the air-fuel mixture, and, to effectively eliminate nitric oxides, the air/fuel proportion must be monitored continuously.

Efficient operation of a nitric oxide adsorber therefore substantially depends on the ability of barium to trap nitrogen dioxide, which in turn depends on various factors, such as exhaust gas temperature, exhaust gas flow, and the number of acceptor sites available in the barium. In the best possible operating conditions, a nitric oxide adsorber effectively eliminates as much as 90% of the nitric oxides produced by the engine.

One of the factors responsible for the reduction in adsorption capacity of barium is the presence of sulphur in the fuel. Unfortunately, at temperatures of over 300° C., sulphur oxidizes to sulphur dioxide ($SO_2$), which in turn may be converted by humidity in the atmosphere to sulphur trioxide ($SO_3$); which compounds react with barium oxide in the same way as nitrogen dioxide, i.e. tend to be trapped in the barium acceptor sites in the form of barium sulphate ($BaSO_4$), so that some of the acceptor sites are permanently occupied by barium sulphate, thus preventing entrapment of part of the nitrogen dioxide, and so impairing adsorber efficiency. In fact, unlike regeneration of acceptor sites saturated with nitrogen dioxide, which occurs between 300 and 450° C., regeneration of sulphate-saturated acceptor sites requires temperatures of around 600° C.

To prevent sulphates damaging the nitric oxide adsorber, the fuel must therefore contain no sulphur or, to limit the extent of damage, must contain at most 10 ppm.

Though slow, sulphate accumulation in the adsorber is therefore inevitable, on account of small quantities being derived anyway from the lubricating oil as well as the fuel, and must be removed periodically, every 1000-4000 km, by a specific regeneration strategy combining reducing environment conditions and temperature levels of around 600° C.

The regeneration strategy of a nitric oxide adsorber is therefore clearly one of the major problems posed by automotive use of this type of catalyst.

For this purpose, various nitric oxide adsorber regeneration strategies have been proposed, which comprise a fixed-duration (about 60-second) accumulation step, during which the air-fuel mixture is lean—in particular, assumes a value (A/F) of 20 to 55—followed by a fixed-duration (about 5-second) regeneration step, during which the air-fuel mixture is enriched—in particular, assumes a value (A/F) of 12 to 14.

Controlling nitric oxide adsorber accumulation and regeneration cycles as described above, however, is unsatisfactory in terms of consumption and pollutant emissions, by regeneration possibly being performed when not strictly necessary, or, conversely, not being performed when actually required.

It is an object of the present invention to provide a method and device for activating regeneration of a nitric oxide adsorber, designed to eliminate the drawbacks of known methods.

SUMMARY OF THE INVENTION

According to the present invention, there are provided a method and device for activating regeneration of a nitric oxide adsorber.

A preferred, non-limiting embodiment of the present invention will be described by way of example with reference to the accompanying drawings, in which

DETAILED DESCRIPTION OF THE PREFERRED EMBODIMENTS

Figure 1:
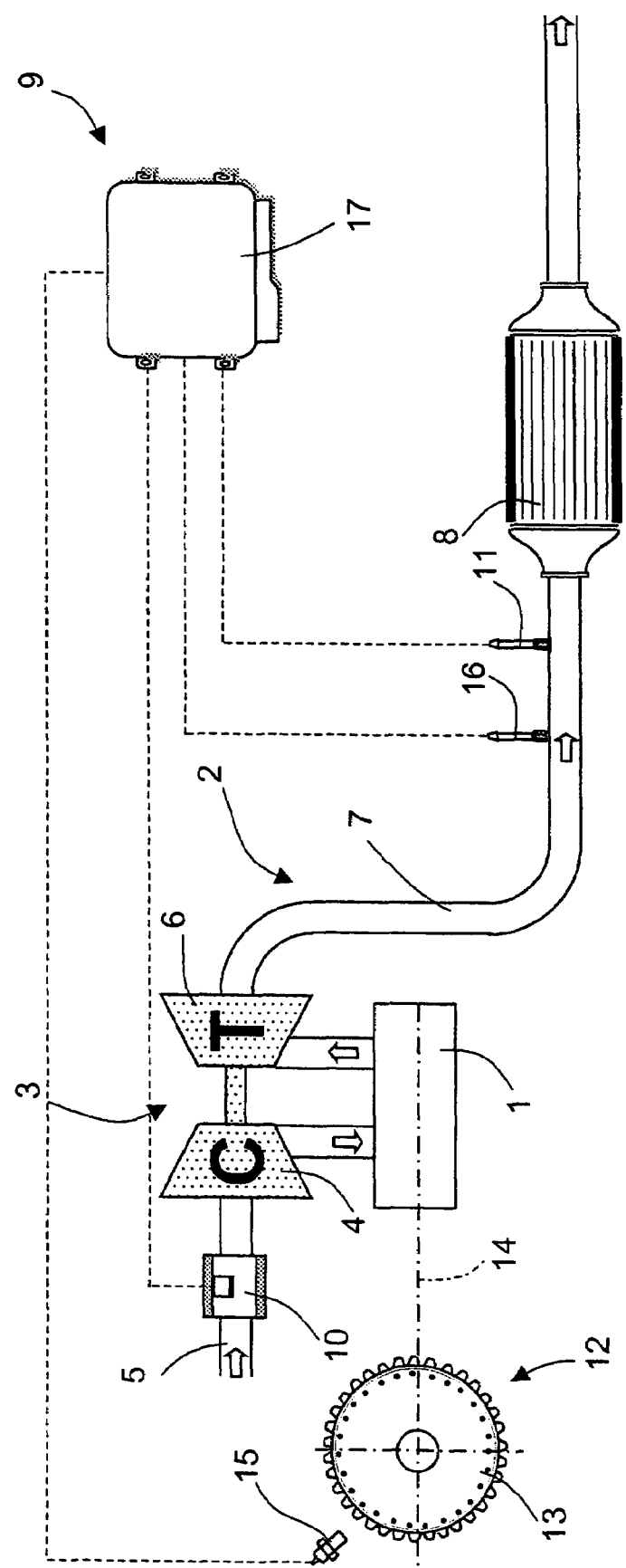
FIG. 1 shows, schematically, an internal combustion engine exhaust system equipped with a nitric oxide adsorber.

Number 1 in FIG. 1 indicates schematically and as a whole an internal combustion engine of a vehicle (not shown)—in particular, a diesel engine having an exhaust system 2, of which are shown only the parts required for a clear understanding of the present invention.

FIG. 1 shows, by way of a non-limiting example, a supercharged engine 1, i.e. comprising a turbosupercharger 3 defined by a compressor 4 located along an air intake manifold 5, and by a turbine 6 connected to compressor 4 and located along an exhaust line 7 for exhausting the gas produced by the engine.

Exhaust system 2 comprises a nitric oxide ($NO_X$) adsorber 8 located along exhaust line 7; and an electronic control system 9 designed, among other things, to control regeneration of nitric oxide adsorber 8 as described below.

More specifically, electronic control system 9 comprises an airflow meter or so-called debimeter 10 located along air intake manifold 5 to measure the air intake flow $Q_A$ of the engine; a temperature sensor 11 located along exhaust line 7, at the inlet or outlet of nitric oxide adsorber 8, to measure the temperature $T_{EXH}$ of the exhaust gas flowing through nitric oxide adsorber 8; a measuring device 12 for measuring engine speed RPM and defined by a pulse wheel 13 fitted to the drive shaft 14 (shown schematically by the dash-and-dot line), and by an electromagnetic sensor 15 facing pulse wheel 13; a nitric oxide concentration sensor 16 located along exhaust line 7, at the inlet or outlet of nitric oxide adsorber 8, to measure the nitric oxide concentration of the exhaust gas flowing through nitric oxide adsorber 8; and an electronic central control unit 17 connected to debimeter 10, to temperature sensor 11, to measuring device 12, and to nitric oxide concentration sensor 16, and implementing, among other things, the method of activating regeneration of nitric oxide adsorber 8 according to the invention.

Figure 2:
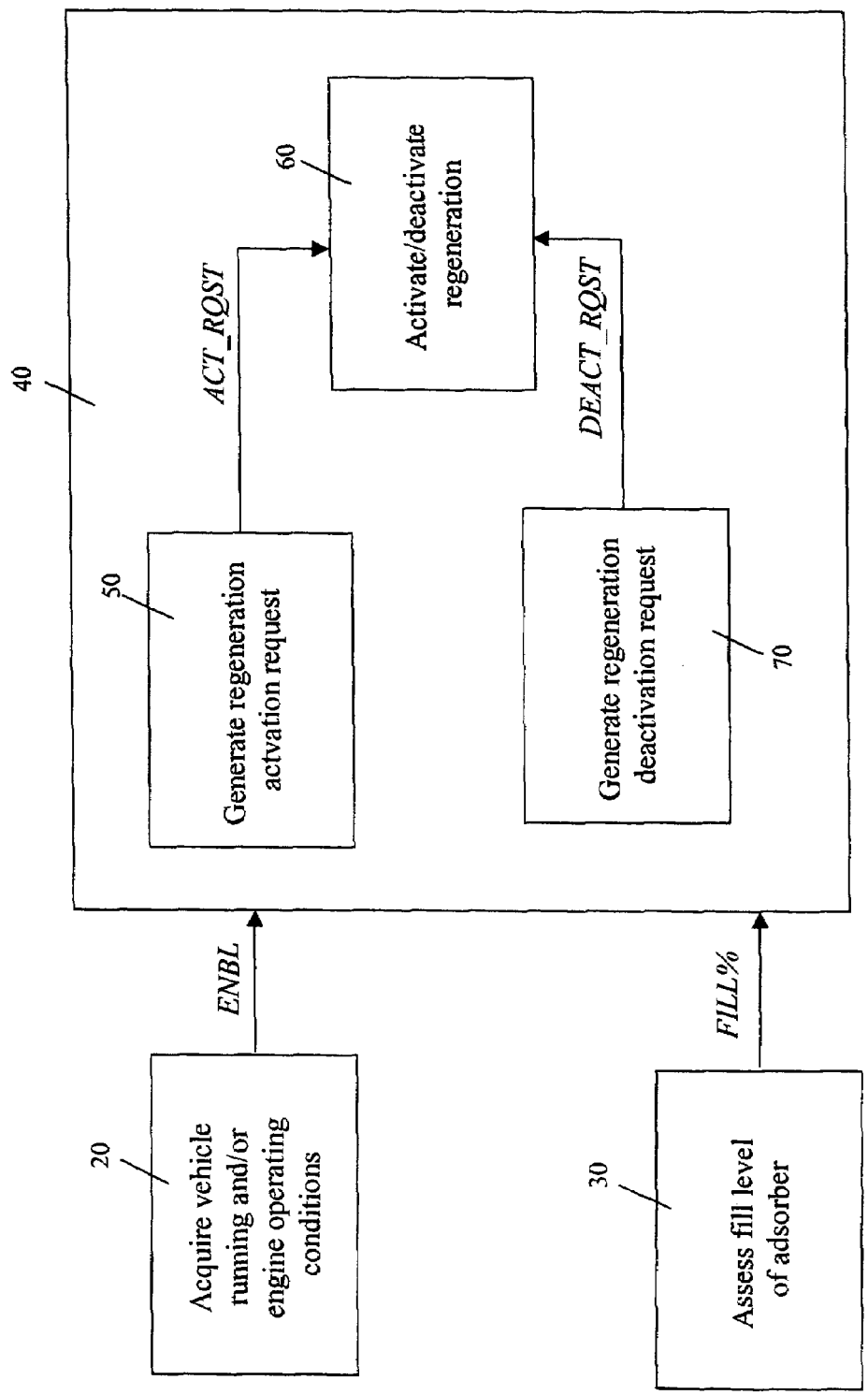
FIG. 2 shows a block diagram illustrating the principle of the method of activating regeneration of a nitric oxide adsorber according to the invention.

FIG. 2 shows a block diagram illustrating the principle of the method of activating regeneration of nitric oxide adsorber 8 implemented by electronic central control unit 17.

More specifically, as shown in FIG. 2, the regeneration activating method according to the invention substantially comprises:

- determining vehicle running and/or engine operating conditions favourable to regeneration of nitric oxide adsorber 8 (block 20);
- assessing the fill level of nitric oxide adsorber 8 on the basis of engine operating conditions, and the characteristics of engine 1, of nitric oxide adsorber 8, and of the fuel used (block 30); and
- controlling activation and deactivation of the engine control strategies for regenerating nitric oxide adsorber 8, depending on the presence or not of the above conditions, and on the basis of the fill level of nitric oxide adsorber 8 (block 40).

More specifically, controlling activation and deactivation of the engine control strategies comprises:

- generating a regeneration activation request to activate regeneration of nitric oxide adsorber 8, when given vehicle running and engine operating conditions are determined, and when the fill level of nitric oxide adsorber 8 is above a given maximum level (block 50);
- generating a regeneration deactivation request to deactivate regeneration of nitric oxide adsorber 8, when given vehicle running and engine operating conditions are determined, and when the fill level of nitric oxide adsorber 8 is below a given minimum level (block 70); and
- activating regeneration of nitric oxide adsorber 8 in the presence of an activation request or after a maximum time has elapsed without the above first vehicle running and engine operating conditions occurring; and deactivating regeneration of nitric oxide adsorber 8 in the presence of a deactivation request or after a maximum time has elapsed without the above second vehicle running and engine operating conditions occurring (block 60).

Figure 3:
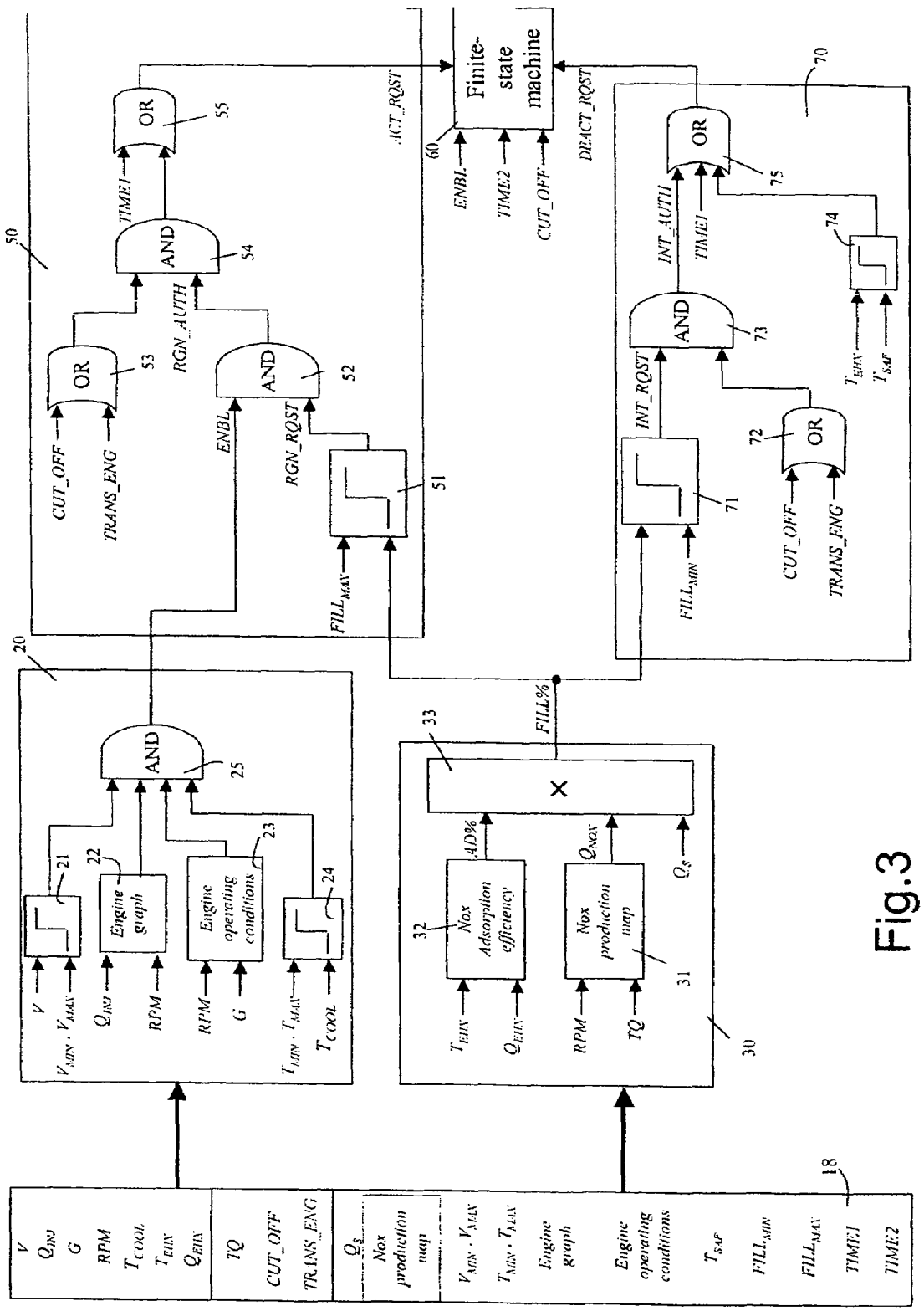
FIG. 3 shows a more detailed block diagram of the method according to the invention.

FIG. 3 shows a more detailed block diagram of the regeneration activating method according to the present invention.

More specifically, as shown in FIG. 3, electronic central control unit 17 first acquires the values of the following quantities indicating vehicle running and engine operating conditions, and on which depends the amount of nitric oxides ($NO_x$) and sulphur dioxide ($SO_2$) produced by combustion (block 18):
- vehicle speed V,
- vehicle gear G,
- injected fuel quantity $Q_{INJ}$,
- engine speed RPM,
- engine cooling fluid temperature $T_{COOL}$,
- exhaust gas temperature $T_{EXH}$, and
- exhaust gas flow $Q_{EXH}$, and determines:
- engine output torque TQ as a function of engine speed RPM, and
- the presence of an injection cut-off (cut-off of fuel supply to the engine) or a transient engine operating state.

Figure 4:
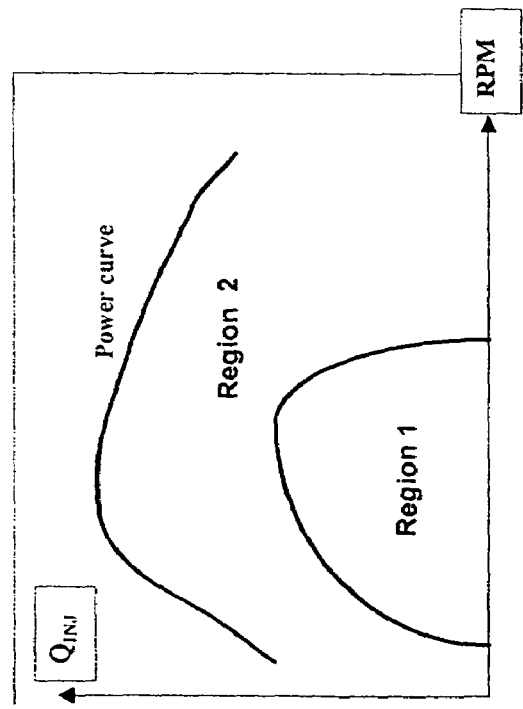
FIG. 4 shows an engine graph.

Electronic central control unit 17 also stores the following parameters of nitric oxide adsorber 8 and the fuel used (block 18):
- the sulphur percentage $Q_S$ of the fuel, as indicated by the petrol company;
- a nitric oxide production map containing the values of the nitric oxides produced in a predetermined time interval as a function of exhaust gas flow $Q_{EXH}$, engine speed RPM and the quantity of fuel $Q_{INJ}$ injected into the engine;
- a minimum speed $V_{MIN}$, e.g. 50 km/h, and a maximum speed $V_{MAX}$, e.g. 120 km/h, with which current vehicle speed V will be compared, as described below;
- a minimum temperature $T_{MIN}$, e.g. 30° C., and a maximum temperature $T_{MAX}$, e.g. 90° C., with which the engine cooling fluid temperature $T_{COOL}$ will be compared, as described below;
- the engine graph divided as shown in FIG. 4, and with which the current operating point of the engine will be compared, as described below;
- engine speed RPM threshold values as a function of the engaged gear;
- an exhaust line safety temperature $T_{SAF}$, e.g. 700° C., above which regeneration strategies must be deactivated immediately for safety reasons;
- a time TIME1, e.g. 10 s, and a time TIME2, e.g. 60 s, both of which can be calibrated and are used in controlling activation and deactivation of regeneration of nitric oxide adsorber 8, as described below; and
- a minimum fill level $FILL_{MIN}$, e.g. 30%, and a maximum fill level $FILL_{MAX}$, e.g. 80%, of nitric oxide adsorber 8.

With reference to FIG. 3, electronic central control unit 17 monitors the vehicle running and engine operating conditions, and generates an enabling signal ENBL (block 25) when conditions favourable to regeneration of nitric oxide adsorber 8 are determined.

More specifically, electronic central control unit 17:
- determines whether vehicle speed V lies between a stored minimum value $V_{MIN}$ and a stored maximum value $V_{MAX}$ (block 21);
- determines whether the engine operating point, defined by injected fuel quantity $Q_{INJ}$ and engine speed RPM, lies in a given region of the engine graph, as described below with reference to FIG. 4 (block 22);
- determines whether, as a function of the engaged gear, engine speed RPM satisfies the stored operating conditions (block 23); and
- compares engine cooling fluid temperature $T_{COOL}$ with the stored minimum and maximum values $T_{MIN}$, $T_{MAX}$ (block 24) to determine correct operating conditions of the engine.

More specifically, FIG. 4 shows the so-called "engine graph", i.e. location of the engine operating points defined by engine speed RPM and injected fuel quantity $Q_{INJ}$. As can be seen, the engine graph, which also shows the so-called "engine power curve", is divided into two regions: a first, indicated "Region 1", in which the operating conditions of the engine are favourable to regeneration of nitric oxide adsorber 8; and a second, indicated "Region 2", in which the operating conditions of the engine are not favourable to achieving a rich air/fuel mixture, and therefore to regeneration of nitric oxide adsorber 8.

More specifically, "Region 1" substantially depends on the characteristics of the engine and on the exhaust system, and is defined in each individual case on the basis of the type of engine and the exhaust system of the vehicle. Block 22 of electronic central control unit 17 therefore determines whether the current engine operating point lies within the first or second region of the engine graph.

Once the above are determined, electronic central control unit 17 generates enabling signal ENBL (block 25) if:
- vehicle speed V is within the specified range;
- engine speed RPM and the engaged gear G satisfy the above conditions;
- engine cooling fluid temperature $T_{COOL}$ is within the specified range; and
- the engine operating point lies in Region 1.

Electronic central control unit 17 then assesses nitric oxide and sulphur oxide adsorption in nitric oxide adsorber 8, and the relative percentage fill level FILL % (block 33), as a function of:
- nitric oxide flow $Q_{NOx}$ through nitric oxide adsorber 8, which may be assessed either on the basis of the exhaust gas nitric oxide concentration supplied by nitric oxide concentration sensor 16—in particular, as a portion of total exhaust gas flow—or on the basis of the aforementioned nitric oxide production map (block 31);
- adsorption efficiency AD % of nitric oxide adsorber 8, which may be assessed as a function of exhaust gas temperature $T_{EXH}$ and flow $Q_{EXH}$ (block 32) on the basis of a physical model taking into account the specific characteristics and actual operation of the nitric oxide adsorber, or on the basis of an engine test bench map; and
- sulphur percentage $Q_S$ of the fuel employed.

Electronic central control unit 17 then determines whether the vehicle running and engine operating conditions and the fill level of nitric oxide adsorber 8 warrant authorization to activate regeneration of nitric oxide adsorber 8, by implementing a three-level decision-making order: request-authorization-actuation.

More specifically, electronic central control unit 17:
- compares the percentage fill level FILL % of nitric oxide adsorber 8 with the stored maximum fill level $FILL_{MAX}$ (block 51);
- monitors the occurrence of an injection cut-off or transient engine operating state (block 53), so that the driver of the vehicle does not experience a sharp change in engine operation, by also counting the time lapse since the last injection cut-off or last transient engine operating state;
- generates a regeneration request RGN_RQST if the fill level FILL of nitric oxide adsorber 8 is above the stored maximum fill level $FILL_{MAX}$;
- generates a regeneration authorization RGN_AUTH in the presence of a regeneration request RGN_RQST and of enabling signal ENBL (block 52); and
- generates an activation request ACT_RQST to activate regeneration of nitric oxide adsorber 8 (block 55):

a) in the presence of a regeneration authorization RGN_AUTH or an injection cut-off or transient engine operating state (blocks 54 and 53); or b) when a time TIME1 has elapsed without an injection cut-off or transient engine operating state occurring (block 55).

During regeneration, electronic central control unit 17 determines whether the vehicle running and engine operating conditions and the fill level of nitric oxide adsorber 8 warrant deactivating regeneration of nitric oxide adsorber 8.

More specifically, electronic central control unit 17:

compares the fill level FILL of nitric oxide adsorber 8 with the stored minimum fill level $FILL_{MIN}$ (block 71);

monitors the occurrence of an injection cut-off or transient engine operating state (block 72), by also counting the time lapse since the last injection cut-off or last transient engine operating state;

generates an interrupt request INT_RQST if the fill level FILL of nitric oxide adsorber 8 is below the stored minimum fill level $FILL_{MIN}$;

generates an interrupt authorization INT_AUTH in the presence of an interrupt request INT_RQST and of an injection cut-off or transient engine operating state (block 73); and generates a deactivation request DEACT_RQST to deactivate regeneration of nitric oxide adsorber 8 (block 75):

a) in the presence of an interrupt authorization INT_AUTH; or b) when a time TIME1 has elapsed without an injection cut-off or transient engine operating state occurring; or c) if exhaust gas temperature $T_{EXH}$ exceeds or equals safety temperature $T_{SAF}$.

Finally, electronic central control unit 17 activates and deactivates regeneration of nitric oxide adsorber 8 on the basis of activation and deactivation requests ACT_RQST and DEACT_RQST and enabling signal ENBL, using a finite-state machine, which performs the operations described below with reference to the state diagram in FIG. 5 (block 60).

Figure 5:
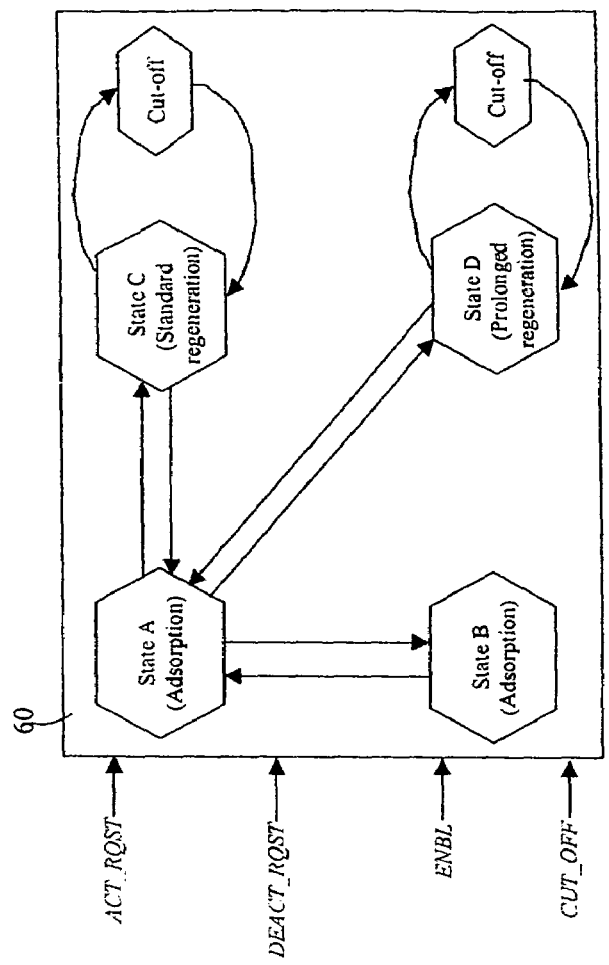
FIG. 5 shows a state diagram of a state machine in FIG. 3.

As shown in FIG. 5, the finite-state machine first switches between a first start state A—in which nitric oxide adsorber 8 is accumulating, and vehicle running and engine operating conditions are favourable to regeneration of nitric oxide adsorber 8 (enabling signal ENBL present)—and a second start state B—in which nitric oxide adsorber 8 is accumulating, and vehicle running and engine operating conditions are not favourable to regeneration of nitric oxide adsorber 8 (no enabling signal ENBL). The duration of second start state B is also counted.

When the finite-state machine is in the first start state A, and an activation request ACT_RQST is generated and the total duration of second start state B is less than TIME2, the finite-state machine evolves towards a first end state C, in which standard regeneration of nitric oxide adsorber 8 is activated; whereas, when the finite-state machine is in the first start state A, and an activation request ACT_RQST is generated and the total duration of second start state B exceeds TIME2, the finite-state machine evolves towards a second end state D, in which prolonged regeneration of nitric oxide adsorber 8 is activated. Prolonged regeneration is necessary when the nitric oxides trapped in nitric oxide adsorber 8 have not been desorbed for some time, and the barium nitrates are stabilized. If the conditions necessary to switch from state B to state A never come about, regeneration is never performed.

Standard regeneration is deactivated upon generation of a deactivation request DEACT_RQST, whereas prolonged regeneration is performed for a set length of time, e.g. 20 s, regardless of the fill level.

Since the reducing conditions necessary to regenerate nitric oxide adsorber 8 cannot be created when no fuel in being injected, the finite-state machine must be able to control cut-off during regeneration. More specifically, in the event of a brief cut-off lasting a few (up to 5) seconds, regeneration of nitric oxide adsorber 8 is not interrupted; whereas, if the cut-off lasts longer, regeneration is temporarily interrupted, and is reactivated when the cut-off ceases, providing the activation conditions still apply.

The advantages of the present invention will be clear from the foregoing description. In particular, as opposed to being fixed, the duration of the accumulation stage depends on the actual degree of saturation of the nitric oxide adsorber acceptor sites, so that the adsorber is regenerated when actually saturated. As such, the regeneration frequency of nitric oxide adsorber 8 is optimized, by assessing the instantaneous fill level of nitric oxide adsorber 8 as a function of engine operating conditions.

Moreover, regeneration is optimized by only regenerating the adsorber when the operating conditions of the engine are favourable.

Moreover, the present invention provides for adapting regeneration duration as a function of the operating "history" of the vehicle during the accumulation state, and for "strict" control of regeneration strategy activation and deactivation conditions.

Clearly, changes may be made to the method as described and illustrated herein without, however, departing from the scope of the present invention, as defined in the accompanying Claims.

What is claimed is:

1. A method of activating regeneration of a nitric oxide adsorber (8) for treating exhaust gas produced by an internal combustion engine (1) of a vehicle comprising the steps of:

determining a quantity indicating the fill level (FILL) of said nitric oxide adsorber (8);

monitoring at least one of the running conditions of the vehicle and operating conditions of the engine (1);

activating regeneration of said nitric oxide adsorber (8) as a function of the fill level (FILL) of said nitric oxide adsorber (8) and as a function of at least one of the running conditions of the vehicle and the operating conditions of the engine (1);

deactivating regeneration of said nitric oxide adsorber (8) as a function of the fill level (FILL) of said nitric oxide adsorber (8) and of the operating conditions of the engine (1), and wherein deactivating regeneration of said nitric oxide adsorber (8) includes:

generating an interrupt request (INT_RQST) as a function of the fill level (FILL) of the nitric oxide adsorber (8);

generating an interrupt authorization (INT_AUTH) in the presence of said interrupt request (INT_RQST) and of given operating conditions of the engine; and generating a deactivation request (DEACT_RQST) to deactivate regeneration of the nitric oxide adsorber (8) in the presence of said interrupt authorization (INT_AUTH).

2. The method as claimed in claim 1, wherein generating an interrupt request (INT_RQST) comprises:

comparing the fill level (FILL) of the nitric oxide adsorber (8) with a second fill level ($FILL_{MIN}$); and generating said interrupt request (INT_RQST) when the fill level (FILL) of the nitric oxide adsorber (8) and the second fill level ($FILL_{MIN}$) satisfy a third relationship.

3. The method as claimed in claim 2, wherein said third relationship is defined by the condition that the fill level (FILL) of the nitric oxide adsorber (8) is below the second fill level ($FILL_{MIN}$).

4. The method as claimed in claim 1, wherein said interrupt authorization (INT_AUTH) is generated in the presence of said interrupt request (INT_RQST) and of an injection cut-off or a transient engine operating state.

5. The method as claimed in claim 1, wherein said interrupt authorization (INT_AUTH) is generated in the presence of said interrupt request (INT_RQST) and if a given time (TIME1) has elapsed without an injection cut-off or a transient operating state of the engine occurring.

6. The method as claimed in claim 1, wherein said deactivation request (DEACT_RQST) to deactivate regeneration of the nitric oxide adsorber (8) is generated in the presence of said interrupt authorization (INT_AUTH) or of given exhaust gas temperatures ($T_{EXH}$).

7. The method as claimed in claim 6, and also comprising:

deactivating regeneration of the nitric oxide adsorber (8) in the presence of said deactivation request (DEACT_RQST).

* * * * *